Sept. 4, 1934.  J. A. SPENCER  1,972,832
THERMOSTATIC CONTROL
Filed Oct. 14, 1932  5 Sheets-Sheet 1
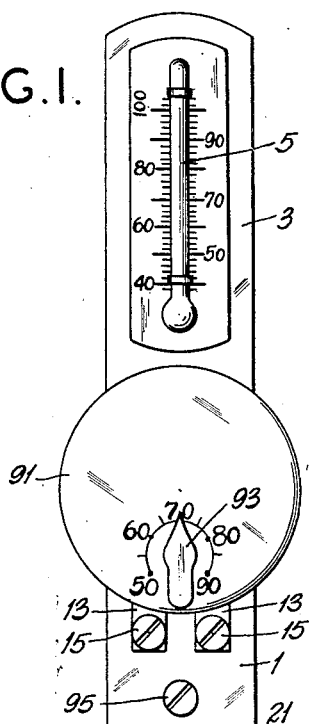
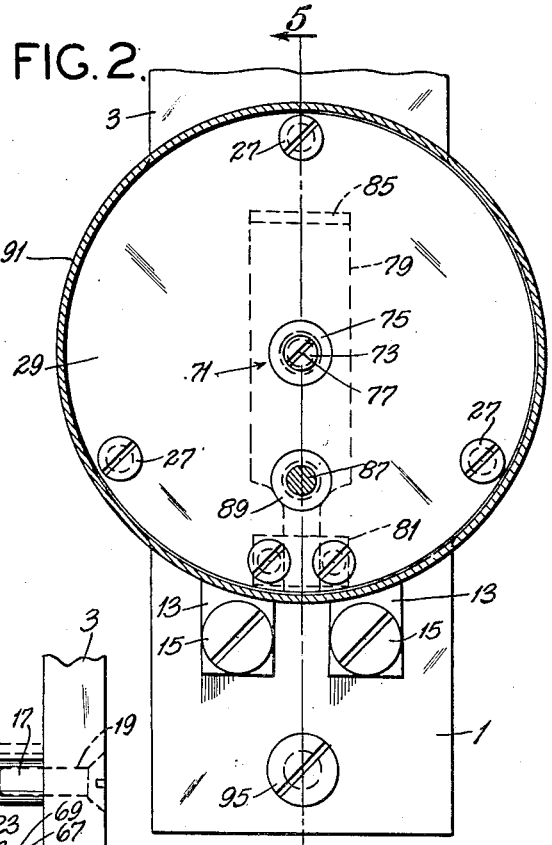
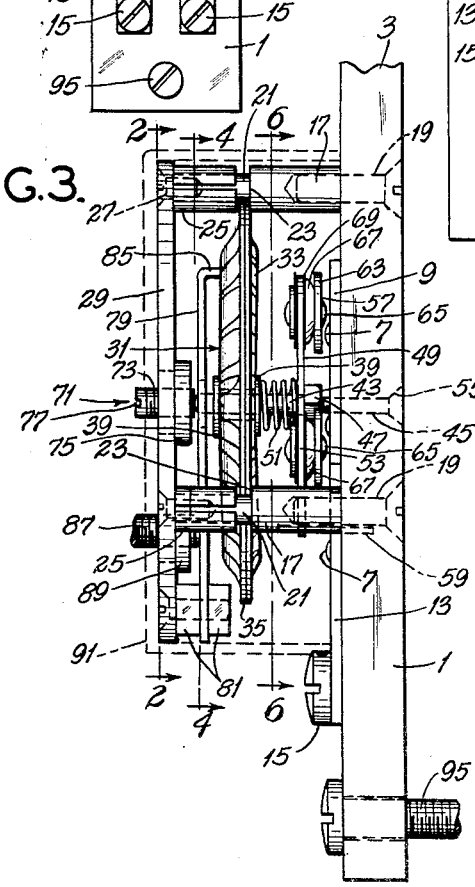
John A. Spencer, Inventor Sept. 4, 1934.   J. A. SPENCER   1,972,832
THERMOSTATIC CONTROL
Filed Oct. 14, 1932   5 Sheets-Sheet 2

John A. Spencer, Inventor

Sept. 4, 1934.   J. A. SPENCER   1,972,832
THERMOSTATIC CONTROL
Filed Oct. 14, 1932   5 Sheets-Sheet 3

Sept. 4, 1934.    J. A. SPENCER    1,972,832
THERMOSTATIC CONTROL
Filed Oct. 14, 1932    5 Sheets-Sheet 4

John A. Spencer,
Inventor,

Patented Sept. 4, 1934

1,972,832

UNITED STATES PATENT OFFICE 1,972,832

THERMOSTATIC CONTROL

John A. Spencer, Newtonville, Mass., assignor to General Plate Company, Attleboro, Mass., a corporation of Massachusetts Application October 14, 1932, Serial No. 637,854

25 Claims. (Cl. 200—138)

This invention relates to controls, and with regard to certain more specific features, to thermostatic controls.

Among the several objects of the invention may be noted the provision of a thermostatic control having improved adjusting features, whereby the temperature operating differential may be closely adjusted, and having further adjusting features whereby the range of temperature operation may be varied; the provision of a control of the class described adapted for electric switch use and having improved contact-making and contact-breaking means; the provision of a thermostatically controlled electric switch of the class described which is capable of carrying relatively high currents at relatively high voltages without affecting the delicacy of its operation; and the provision of a thermostatic control of the class described which is compact and relatively simple in construction and operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a front elevation of one embodiment of the present invention, as applied to an electric switch;

Fig. 2 is an enlarged front elevation of a portion of Fig. 1, a cover member being removed;

Fig. 3 is a side elevation of the switch as shown in Figs. 1 and 2;

Similar reference characters indicate corresponding parts throughout the several views of the drawings.

In my copending patent application Serial No. 516,042 filed February 16, 1931, I have shown an improved form of thermostat, which, for its size, has a greatly increased throw or travel between its "cold" and "hot" positions, and has improved thermal-response characteristics. It is a principal object of the present invention to embody, or provide for the embodiment of, such improved thermostat in a thermostatic control, particularly such as an electric switch as adapted for household or room temperature control. To this end, it is desirable, first, that the operating differential of the thermostatic switch be reduced to a minimum, second, that there be no considerable lag between the room temperature and the temperature of the thermostat, and, third, that the thermostat be capable of adjustment whereby it operates at any desired temperature. The invention as hereinafter described meets all of these requirements, and in addition presents numerous other advantages.

Referring now more particularly to Figs. 1 to 5, numeral 1 indicates a base-board, mounting panel, or the like, upon which the invention is assembled. In Fig. 1 is shown (at numeral 3) an upward extension of the base 1, which carries a thermometer 5. The thermometer 5 is not a part of the invention, but is provided, as is customary in switches of this art, merely as a convenience for the user.

Figure 6:
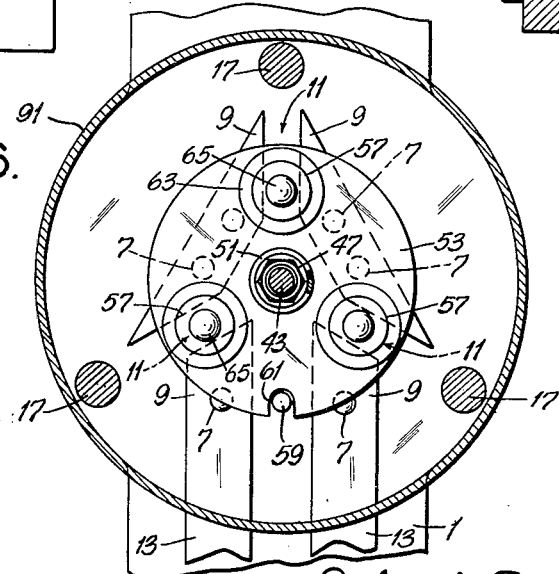
Fig. 6 is a section taken on line 6—6 of Fig. 3.

Mounted directly upon the base 1 (which, under these circumstances, is made of a suitable insulating material) as by rivets 7 are a series of contact plates 9 (Fig. 6), with gaps 11 therebetween. The two end plates 9, as indicated at numeral 13, constitute the terminals of the switch and are accordingly provided with suitable binding posts 15 (Figs. 1 and 2). The arrangement is such that three gaps 11 are provided between the two terminal plates 13. This number (three) is not arbitrary, but by way of example only.

Figure 4:
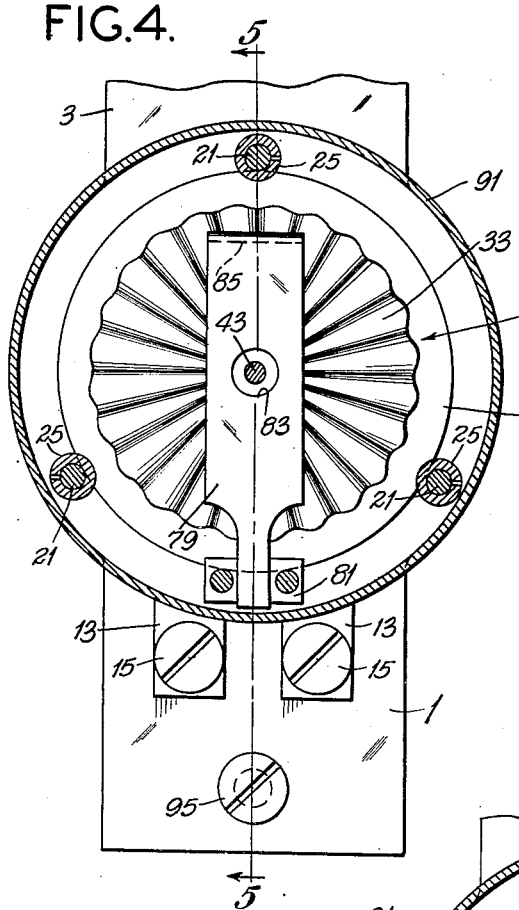
Fig. 4 is a section taken on line 4—4 of Fig. 3.
Figure 5:
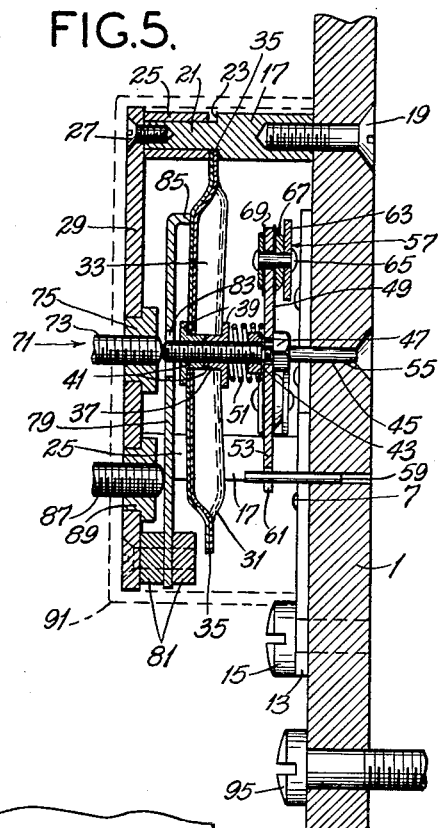
Fig. 5 is a section taken on line 5—5 of Figs. 2 and 4.

Spaced at intervals of 120°, more or less, around the contact plate assembly, are three mounting or supporting pillars or columns 17. Machine screws 19 hold the columns 17 upright on base 1. The columns 17, toward their upper end, are provided with reduced-diameter portions 21, leaving shoulders 23 (Figs. 3 and 5). Sliding upon the portions 21 are collars 25. Mounted on top of the columns 17 by means of machine screws 27 is a circular face-plate 29.

Numeral 31 indicates a thermostatic element of the type disclosed and claimed in my said copending application. It comprises a disc of thermostatic metal (usually bimetal), the central portion of which is radially corrugated, as indicated at numeral 33, but the edge portion 35 whereof is flat or flattened. A central opening 37 is provided in the corrugated region 33 (Fig. 5). The disc as a whole is normally dished, or made slightly conical, in one direction. Normally, when the thermostat is to be used to turn on a circuit when the temperature drops to a predetermined value, the dishing is such that, at temperatures below said predetermined value, the metal layer of the thermostatic metal having the higher coefficient of thermal expansion is on the concave side of the disc.

The action of the thermostat 31 is such, that as temperature change occurs, past a predetermined value, the direction of curvature of the disc reverses itself with a snap. The fact is that when the temperature is rising, the snapping temperature is higher, for the same thermostat, than the snapping temperature when the temperature is falling, the difference being termed the operating differential. For example, in the heating phase, a thermostat snaps from cold to hot position at 85° F., while the same thermostat, in the cooling phase, snaps from hot to cold position at 80° F., the difference (85°—80°=5) being known as the operating differential of the particular thermostat.

Returning to the switch, the thermostat 31 is mounted on the columns 17, by its flat edge portion 35 being held between shoulders 23 and collars 25, the collars being held on the columns 17 by screws 27. Clearance is preferably provided in these mountings as illustrated in Figure 3. This leaves the central portion 33 of the thermostat free to snap into its two opposite positions of curvature with temperature changes.

A pair of nuts 39 having cylindrical portions 41 extending into each side of the opening 37 of disc 31 are threaded on a shaft 43 extending transversely of the general plane of the thermostat. The nuts 39, while for all practical purposes mechanically interconnecting shaft 43 and thermostat 31, are provided with the suitably sized cylindrical portions 41 so that they may be drawn tightly together, but at the same time allow sufficient freedom to the thermostat so as not to alter its operating characteristics. The shaft 43 extends downwardly from disc 31, and has a portion 45 of reduced diameter, the majority of which is preferably unthreaded. On the relatively short threaded portion of shaft 45 is rather loosely mounted, by nuts 47, a contact-bridging assembly 49. A compression spring 51, reacting at one end against a plate 53 of assembly 49, and at the other end against the lower nut 39, forces said assembly 49 always into its right hand position, relative to the shaft 43.

The lower, unthreaded portion 45 of shaft 43 slides freely in a hole 55 of base 1.

The contact-bridging assembly 49 comprises the plate 53, which is usually circular, upon which are insulatedly mounted three contact buttons 57. The buttons 57 are preferably allowed a slight degree of motion on plate 53. The buttons 57 are so arranged that they bridge each gap 11 (Fig. 6) of the contact plates 9, so that, when one of them completes a circuit across its particular plates 9, the others do likewise and instantly establish an electrical connection between terminals 13. To keep the plate 53 from rotating, a pin 59 is rigidly mounted in base 1, and engages a slot or notch 61 in the edge of plate 53.

The buttons 57 each comprise (Fig. 5) a disc 63 of good conducting metal, loosely held by a rivet 65 to disc 53. Also on the rivet 65 is a rounded plate 67, upon which the disc 63 rocks through a few degrees. Insulating material 69 electrically isolates disc 63 from disc 53.

The buttons 57 may well be made in accordance with the teachings of Spencer Patent 1,697,886, dated January 8, 1929. The contact plates 9, in turn, may well be made in accordance with the teachings of Marshall Patent 1,700,172, dated January 29, 1929.

As has been indicated, the thermostat 31 is subject to two adjustments: first, the adjustment of the operating differential, and, second, the adjustment of the temperature of operation, independently of the differential.

The differential adjustment is effected by means of a stop assembly 71, comprising a screw 73 and bearing 75 (Fig. 5) mounted in face plate 29. The end of shaft 43 is coaxial with screw 73, so that it abuts thereagainst. Inasmuch as differential control is usually a matter of factory adjustment, the only manipulative means shown for the screw 73 comprises a slot 77.

The temperature adjustment is effected by means of a spring lever 79, (Figs. 4 and 5) rigidly secured at one end in clamping blocks 81 held on the back-side of face plate 29. The lever 79 extends across the center of thermostat 31 (a hole 83 being provided to clear shaft 43 and/or screw 73), to engage the top face of thermostat 31 with a bent-over edge 85. Edge 85 engages the thermostat 31 at a point relatively near to the edge of the corrugated region 33. Engaging the lever 79 near its mounted end is a screw 87, borne in a suitable bushing 89 on face plate 29. By advancing the screw 87 inwardly, the lever is flexed against the thermostat, and, increasing the resilient pressure brought to bear on the face of thermostatic disc 31.

A cover 91 (Figs. 1 and 2) is desirably provided for the switch assembly. However, the screw 87 projects through cover 91 and is provided with a knob 93 having a pointer, which juxtaposes a suitable temperature scale formed on cover 91.

Mounting screws 95 (Fig. 1) are desirably provided for hanging the device as a whole in the desired location.

The operation of the switch as thus described is as follows:

Assuming that the thermostat 31 is in its hot position when dished outwardly (as in Figs. 3 and 5), the contacts are broken at gaps 11 by the lifted plate 53. The operating differential is now adjusted, presumably at the factory, by rotating screw 73 and thus, by the abutment of screws 73 and shaft 43, altering the extent of dishing of the thermostatic disc.

For example, with a thermostatic disc 1½″ in diameter, made of 0.015″ thick bimetal (low expansion member, 36% nickel steel; high expansion member, nickel-chromium steel having 22% nickel and 3% chromium), upon careful adjustment the differential may be reduced to a total of 1° F., which is quite small enough to be unnoticeable in household use.

With the differential adjusted to minimum value, in the described thermostat, the separation between contact plates 9 and buttons 57, in off position, may be as little as 0.015", and the switch will still carry as high as 6 amperes in a resistance load on a 150 volt D. C. circuit, or a 220 volt A. C. circuit. When the switch is thus open or off the spring 51, by balancing the plate 53, holds all buttons 57 off contact plates 9, although no damage is done if, due to vibration or the like, one of the buttons closes its respective gap momentarily, for all three gaps cannot at once be closed in this manner, and even one gap open is ample to withstand the applied voltage after the circuit has once been opened.

The temperature adjusting means, comprising the spring lever 79 and knob 93, etc., is next adjusted.

The position and flexibility of the spring lever 79 are important. When these are correct, the force exerted by the lever 79 will control the operating temperature successfully over a wide range, for example, from 50° F. to 90° F. If, however, the lever is too stiff, or if its point of contact with the thermostatic disc 31 is too near the center of said disc, its tendency will be to make the disc creep rather than to move with the desired snap action. If the lever 79 is too flexible, or if its point of contact with the thermostatic disc 31 is too near the periphery of said disc, its tendency will be to increase the operating differential to an undue extent. In connection with a thermostatic disc 1½" in diameter, a lever of spring steel of 0.025" thickness and the general shape and size indicated, relatively, in the drawings has been found satisfactory. Final adjustment of the point of contact of lever 79 with thermostat 31 may be effected by moving said lever in and out of clamping blocks 81. This adjustment likewise comprises an adjustment of the operating differential of the disc, as the closer the point of contact of the lever 79 with the disc is brought to the periphery of the disc, the greater will be the operating differential, as indicated above. This adjustment frequently constitutes the final, accurate factory adjustment of the operating differential. However, this movement of the lever 79 in and out of the blocks 81 is not to be confused with adjustment of the tension of the lever by operation of the nob 93, for the purpose of adjusting the operating temperature of the disc.

The spring lever 79 in reality has two functions. First, it adjusts the operating temperature (that is, it adjusts the temperature at which the device operates). Second, it effects a reduction of the differential per se, independently of the temperature of operation. This latter effect is secured by reason of the fact that the force exerted by the spring lever 79 upon the thermostat 31, when the switch is open, is greater, for a given setting of knob 93, than when the switch is in closed position. The increment of force exerted by the spring lever, which comes into action when the thermostatic disc snaps, is always in such a direction as to oppose the motion, or, in other words, to favor the reverse motion. The reverse motion will therefore occur with a lesser temperature change than would be necessary were this increment absent, and hence the differential is reduced.

As has been indicated, upon suitable temperature change the thermostatic disc 31 reverses its curvature with a snap. Assuming that the reversal takes place from switch-open position (represented in Figs. 3 and 5) to switch-closed position, the following action takes place:

The moving central portion of the thermostatic disc 31 carries with it, by axial movement, the central shaft 43. Thus plate 53 of contact assembly 49 is moved toward the contact plates 9. Because of the rather loose engagement of plate 53 with shaft 43, the said plate 53 is permitted to rock a few degrees and each button 57 made to bridge its respective gap 11 with equal pressure (the circuit being thus completed).

When the thermostat again reverses its curvature, upon temperature change in the opposite (disconnecting) sense, the loose engagement of plate 53 with shaft 43, and the spring 51, all cooperate to permit a slight axial movement of shaft 43 before plate 53 is moved, so that when said plate 53 is moved, the action is a light hammer blow to disconnect buttons 57 and plates 9. The hammer blow is advantageous to minimize arcing, particularly as coupled with the series-break type of switch here employed.

This completes the description of the first, and preferred embodiment of the invention. It will be apparent that the switch as thus described may be combined with a clock mechanism, so that the temperature adjustment is automatically made, say diurnally, in a preestablished manner. Such a clock, for example, might well be used to move knob 93 directly, between two manually set stops. Or, two switches might well be used, one set for one temperature and the other set for another temperature, and the clockwork means utilized to switch from one to the other switch at preestablished times.

Figure 7:
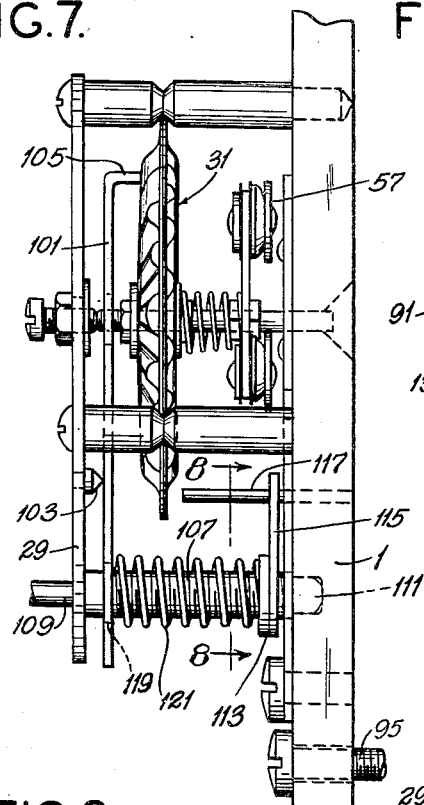
Fig. 7 is a side elevation similar to Fig. 3 illustrating a second embodiment of the invention.
Figure 8:
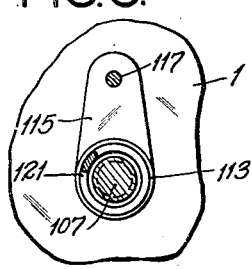
Fig. 8 is a cross-section taken on line 8—8 of Fig. 7.

Figs. 7 and 8 show an embodiment of the invention in which the spring lever 79, which was in reality a leaf spring, is replaced with a rigid, unbendable lever 101 rocking upon a fixed fulcrum 103 mounted on face plate 29. As in the prior embodiment, the end 105 of lever 101 is bent to abut thermostat 31. The adjusting mechanism for lever 101 comprises a screw 107, borne at one end 109 in face plate 29 and at the other end 111 in base 1. The screw 107 does not threadably engage either face plate 29 or base 1. Upon the end 109 of screw 107 the adjusting knob 93 is mounted.

A sliding nut 113 is provided on screw 107 between face plate 29 and base 1. The nut 113 is prevented from rotating by the engagement of a projection 115 therefrom with a pin 117 rigidly mounted in base 1. By this arrangement, nut 113 moves up and down screw 107 as said screw is rotated. The screw 107 passes freely through a hole 119 in lever 101. Between lever 101 and nut 113 is a compression spring 121.

It will be seen that, in this embodiment, in place of the resiliency being supplied by the lever itself, the resiliency is supplied by the compression spring 121. The degree of resiliency, and hence the amount of force applied to thermostatic disc 31, is controlled by the extent of compression of spring 121, which is in turn controlled by the position of nut 113 on screw 107, and which is itself controlled by manual rotation and setting of screw 107.

Functionally, and in operation, this Fig. 7 and Fig. 8 embodiment does not materially differ from the embodiment of Figs. 1 to 6.

Figure 9:
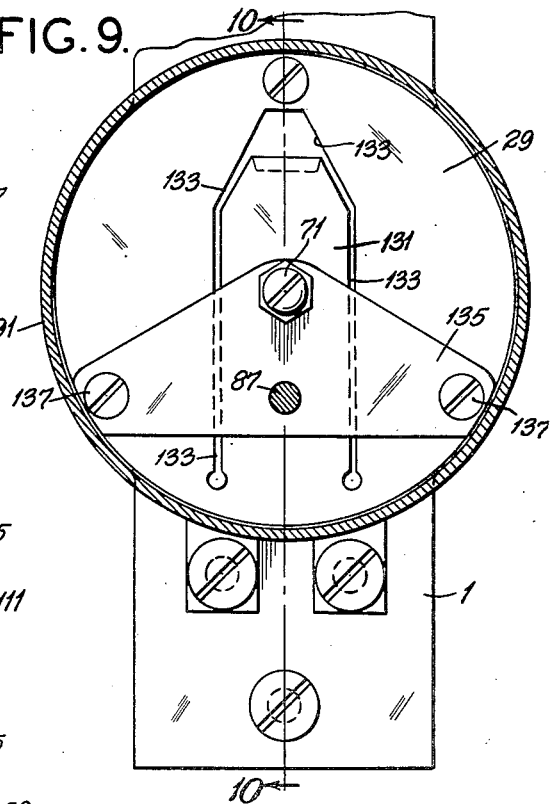
Fig. 9 is a view similar to Fig. 2 but showing a third embodiment of the invention.
Figure 10:
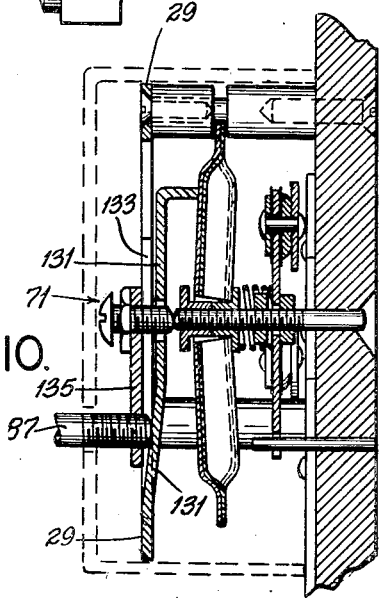
Fig. 10 is a section taken on line 10—10 of Fig. 9.

The embodiment shown in Figs. 9 and 10 returns in principle to the first embodiment (that is, the resiliency of the adjusting means is supplied by the lever itself). However, in this Fig. 9 and Fig. 10 embodiment, the lever 131 (corresponding to lever 79 in the first embodiment) is struck from, or released from, the face plate 29, by a series of cuts 133 (Fig. 9). A mounting plate 135 is now secured to the face plate 29, as by bolts 137, and on this plate 135 are mounted the adjustable differential-control abutment 71 and the temperature regulating screw 87. Adjustment of the tension of lever 131 is again, as heretofore, made by rotation of screw 87.

The operation of the embodiment of Figs. 9 and 10 does not differ substantially from the operation of the embodiments heretofore described.

Figure 11:
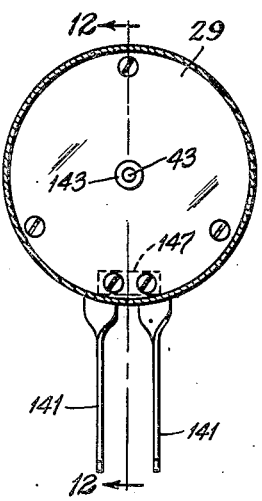
Fig. 11 is a view similar to Fig. 2 but showing a fourth embodiment of the invention.
Figure 12:
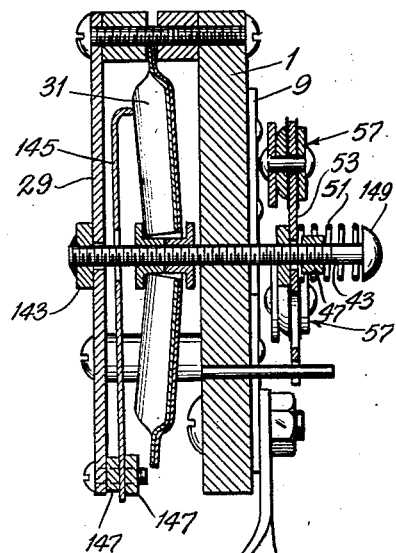
Fig. 12 is a section taken on line 12—12 of Fig. 11.
Figure 13:
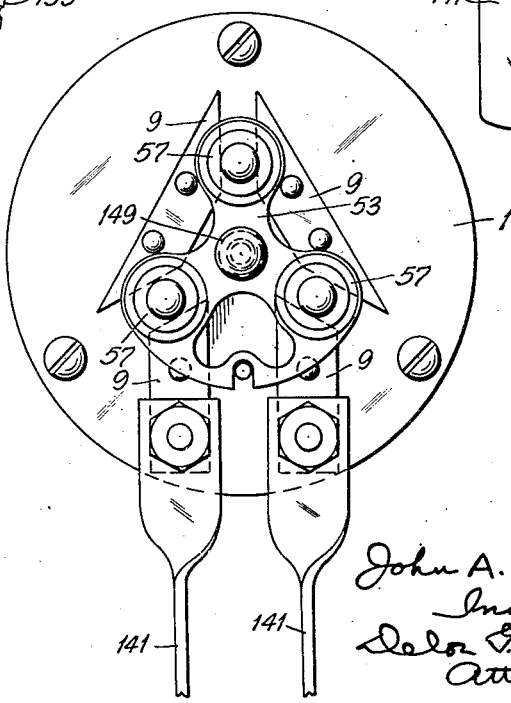
Fig. 13 is a back elevation of the switch shown in Fig. 11.

The previously described embodiments have all been designed primarily as regulators for household temperature, and as such, their operation is generally such that they operate to make the circuit when the temperature falls below a pre-established minimum, and to break such circuit when the temperature rises above such pre-established temperature. The embodiment shown in Figs. 11, 12, and 13, on the other hand, is designed particularly for automatic refrigeration, such that the circuit is completed when the temperature rises above a limit, and broken when the temperature falls below such limit. Another, perhaps simpler, method of achieving the same end is through a simple reversal of the thermostatic disc in the embodiments of Figs. 2 to 5, it being understood, of course, that the contact buttons and the like are also suitably repositioned for the reversed disc. In the embodiment of Figs. 11, 12, and 13, which is none-the-less preferable in certain circumstances, the contact plates 9 are mounted upon the reverse side of the base 1, the shaft 43 extends entirely through said base 1, and the movable contact assembly 49 is also mounted upon the reverse side of base 1. Thus, when the thermostatic disc 31 is concave to the right, as shown in Fig. 12, the contacts are broken, and when the disc 31 is concave to the left, contacts are made (the reverse of previous embodiments).

Further differences in this embodiment comprise the plug terminal pieces 141, which are adapted to enter an ordinary electrical socket outlet (thereby making the device, as a whole, a removable unit), and the complete lack of adjustability features, other than factory adjusting means (adjustability is, in general, unnecessary for this type of thermostat). The differential control, in this instance, is supplied by the abutment of buttons 57 against contact plates 9, and may be factory-set by adjustment of the effective length of shaft 43. In the other direction, movement of the thermostatic disc 31 is limited by a nut 143, soldered to the end of shaft 43, engaging the face plate 29. The temperature adjusting means comprises a leaf spring 145, similar to the spring lever 79 of the first embodiment, and supported in blocks 147 similar to the blocks 81 of the first embodiment. But in this case, no adjusting means (other than the factory adjustment through manipulation of the blocks 147) is provided for the spring 145.

A head 149 rearwardly terminates shaft 43. Against the head 149 abuts one end of the compression spring 51, the other end of said spring abutting one of the nuts 47 holding disc 53 in position.

As shown in Fig. 13, contact-carrying disc or plate 53 may be cut to reduce its area and weight, and hence its inertial resistance, close to the outlines of the buttons 57. This feature is of course applicable to all embodiments of the invention.

The operation of this embodiment is not appreciably different from that of the embodiment of Figs. 1 to 6, with the exception that adjustments (other than factory adjustments) of the differential, or of the operating temperature, cannot be made.

Figure 14:
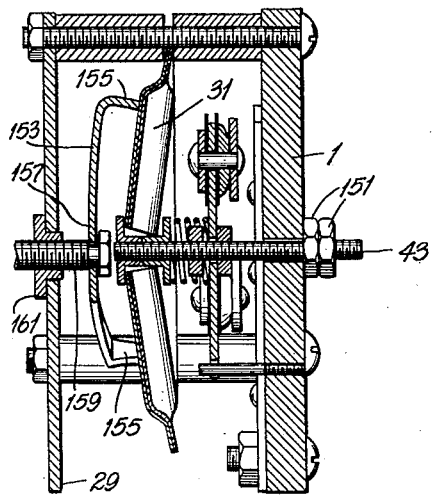
Fig. 14 is a section similar to Fig. 5 illustrating a fifth embodiment of the invention.

Fig. 14 shows still a further embodiment of the invention. Here the differential control is achieved by extending shaft 43 through the base 1, and threading a pair of nuts 151 (which lock each other) thereon. The movement of the thermostatic disc to the left, in this embodiment, is limited by engagement of the nuts 151 with the back of base 1, in contrast to the forward abutment in previous embodiments.

Figure 15:
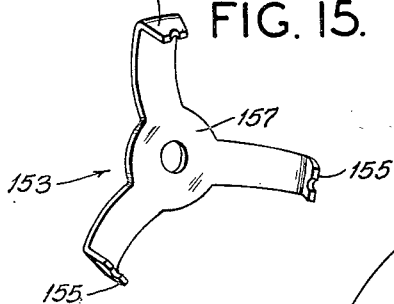
Fig. 15 is a perspective view of a spring element used in the switch shown in Fig. 14.

A further distinction of this embodiment is the temperature adjusting means. A spring spider 153 (see also Fig. 15) is provided, which has bent ends 155 engaging the thermostatic disc 31 at a plurality of points (three, in the device shown). The central portion 157 of the spider 153 is rotatably secured to a screw 159 which is threaded into a bushing 161 mounted upon face plate 29. By rotating the screw 159, more or less pressure is brought to bear, through the spider 153, upon disc 31, and in this manner the operating temperature is adjusted.

Figure 16:
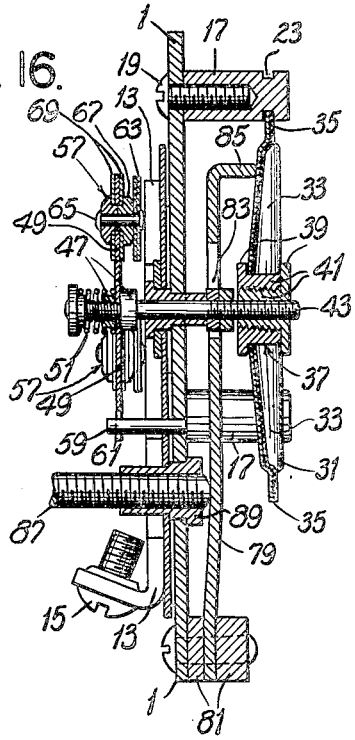
Fig. 16 is a section similar to Fig. 5 illustrating a sixth embodiment of the invention; and, Fig. 17 is a section similar to Fig. 5 illustrating the application of the invention to a valve control.

Fig. 16 shows still a further embodiment of the invention, particularly adapted for such uses (as in the regulation of water pipe or boiler temperatures) that require the prepositioning of the thermostatic disc in close proximity or heat-conducting relationship to the object the temperature of which is to be regulated (as the wall of the pipe or boiler). This adaptability is provided by leaving one face of the thermostatic disc (the right-hand face in Fig. 16) free of superstructure such as the adjusting means, which means are accordingly displaced to the other face of the disc. No particularized description of the structure of the Fig. 16 embodiment need here be given, as the drawings, in view of the descriptions of prior embodiments, are adequate in themselves.

Figure 17:
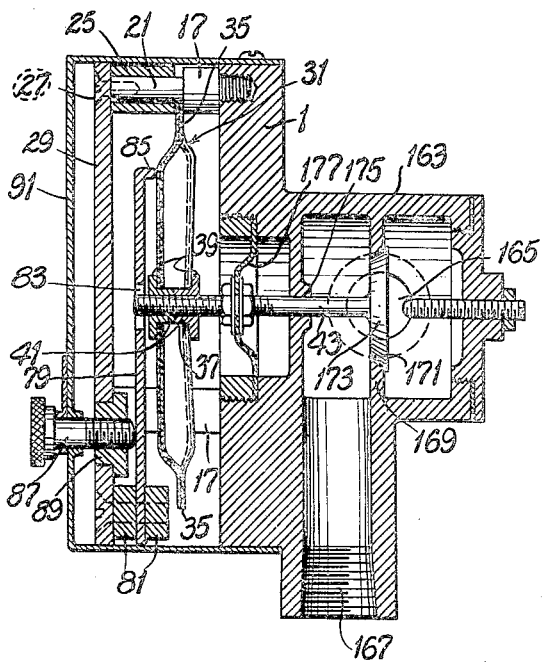

In all of the embodiments heretofore described, the invention has been considered in connection with electric switch elements as a thermostatic-electric control. However, the invention is equally well adapted for the purpose of fluid valve, and like controls. This phase of the invention is illustrated by Fig. 17, which has substantially the identical thermostatic control features as Fig. 5, but in which the electric switch elements of Fig. 5 are replaced by valve elements. Numeral 163 indicates a valve casing, provided with the customary inlet port 165, outlet port 167, partition 169, and valve seat 171. A valve closure 173 is supported on the stem or shaft 43—45 of the thermostatic control, passing through a sliding-bearing 175 in casing 163. A sealing diaphragm 177 (or, alternately, a bellows) is desirably provided to make the valve compartment fluid-tight at the thermostat connection.

The operation of this embodiment is not substantially different from that of the electric switch embodiments, the essential difference being that the closure 173 is seated and unseated from the seat 171 as the thermostatic element snaps, in contrast to the making and breaking of electrical contacts in prior embodiments.

It will be understood that all of the various forms of control described may with equal propriety be adapted for valve control in the manner suggested.

While several embodiments have heretofore been described, which vary to a large extent in their structural features, certain common features are to be found in all of the embodiments. For example, in all embodiments, differential control is achieved through limiting the extent of motion of the central, movable part of the thermostatic disc, and hence the extent of its concavity, while temperature adjustment is similarly uniform throughout the embodiments in the provision of resilient means reacting against one side of the disc between its center and its rim to provide a force aiding, in the one sense, and opposing, in the other sense, the structural resistance of the disc to undergo movement or snapping. In all embodiments here shown, this last means comprises one (or more) resilient elements engaging the thermostatic disc at a point (or points) between the center and the periphery thereof. The movable contacts of the electrical embodiments and the valve closure of the valve embodiments are uniformly secured to, and spaced from, the center of the thermostatic disc, which is the region of the said thermostatic disc undergoing the greatest amplitude of movement at the time of snapping. In all embodiments, the thermostatic disc is supported at spaced points around its periphery, whereby opportunity is afforded for free, unimpeded circulation of the ambient medium, whereby more accurate and rapid response to ambient temperature conditions is assured. In connection with the last point, however, it is to be noted that the invention is readily workable, even though circular peripheral supports be used to mount the thermostatic disc. In all embodiments, the improved, loose manner of mounting the movable contact-carrying plate is found. Other structural indentities are too numerous to mention.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A thermostatic electric switch comprising a radially corrugated, snap-acting thermostatic disc, means mounting said disc at its periphery, at least one movable contact, means mounting said contact for movement with said disc, at least one stationary contact positioned to cooperate with said movable contact, means controlling the operating differential of said thermostatic disc comprising means limiting the thermostatic movement of the central portion of said disc, and means controlling the operating temperature of said thermostatic disc comprising a resilient element bearing upon at least one point on the surface of said disc, said point being located between the central portion and the periphery of said disc.

2. Control means comprising a radially corrugated, snap-acting thermostatic disc, means mounting said disc at its periphery, and means controlling the operating differential of said thermostatic disc comprising means limiting the thermostatic movement of the central portion of said disc, and means controlling the operating temperature of said thermostatic disc comprising a resilient element bearing upon at least one point on the surface of said disc, said point being located between the central portion and the periphery of said disc.

3. A thermostatic electric switch comprising a radially corrugated, snap-acting thermostatic disc, means mounting said disc at its periphery, a shaft secured to the central portion of said disc, at least one movable contact, means mounting said contact for movement with said shaft, at least one stationary contact positioned to cooperate with said movable contact, and non-resilient stop means cooperating with said shaft to limit the amplitude of movement of said central portion to said thermostatic disc in each direction, thereby to control the operating differential of said thermostatic disc.

4. A thermostatic electric switch comprising a radially corrugated, snap-acting thermostatic disc, means mounting said disc at its periphery, a shaft secured to the central portion of said disc, at least one movable contact, means mounting said contact for movement with said shaft, at least one stationary contact positioned to cooperate with said movable contact, means cooperating with said shaft to limit the amplitude of movement of said central portion of said thermostatic disc, thereby to control the operating differential of said thermostatic disc, and separate means controlling the operating temperature of said disc comprising resilient means bearing upon said disc at at least one point spaced between said central portion and the peripheral portion thereof.

5. A thermostatic electric switch comprising a radially corrugated, snap-acting thermostatic disc, means mounting said disc at its periphery, a shaft secured to the central portion of said disc, at least one movable contact, means mounting said contact for movement with said shaft, at least one stationary contact positioned to cooperate with said movable contact, and non-resilient stop means cooperating with said shaft to limit the amplitude of movement of said central portion of said thermostatic disc in each direction, thereby to control the operating differential of said thermostatic disc, said last-named means being adjustable, whereby the operating differential of said thermostatic disc may be adjusted.

6. A thermostatic electric switch comprising a radially corrugated, snap-acting thermostatic disc, means mounting said disc at its periphery, a shaft secured to the central portion of said disc, at least one movable contact, means mounting said contact for movement with said shaft, at least one stationary contact positioned to cooperate with said movable contact, means cooperating with said shaft to limit the amplitude of movement of said central portion of said thermostatic disc, thereby to control the operating differential of said thermostatic disc, and separate means controlling the operating temperature of said disc comprising resilient means bearing upon said disc at least one point spaced between said central portion and the peripheral portion thereof, said last-named means being adjustable, whereby the operating temperature of said thermostatic disc may be adjusted.

7. A thermostatic electric switch comprising a radially corrugated, snap-acting thermostatic disc, supporting means including means mounting said disc at its periphery, movable contact means, means mounting said contact means for movement with the central, movable portion of said disc, stationary contact means mounted on said supporting means in position to cooperate with said movable contact means, and means controlling the operating temperature of said thermostatic disc comprising resilient means bearing upon said disc at at least one point spaced between said central portion and the peripheral portion thereof.

8. A thermostatic electric switch comprising a radially corrugated, snap-acting thermostatic disc, supporting means including means mounting said disc at its periphery, movable contact means, means mounting said contact means supported for movement with the central, movable portion of said disc, stationary contact means mounted on said supporting means in position to cooperate with said movable contact means, and means controlling the operating temperature of said thermostatic disc comprising resilient means bearing upon said disc at at least one point spaced between said central portion and the peripheral portion thereof, said last-named means being adjustable, whereby the operating temperature of said thermostatic disc may be adjusted.

9. A thermostatic electric switch comprising a radially corrugated, snap-acting thermostatic disc, supporting means including means mounting said disc at spaced points on its periphery, movable contact means, means mounting said contact means supported for movement with the central, movable portion of said disc, stationary contact means mounted on said supporting means in position to cooperate with said movable contact means, and means controlling the operating temperature of said thermostatic disc comprising resilient means bearing upon said disc at at least one point spaced between said central portion and the peripheral portion thereof.

10. A switch as set forth in claim 7, in which the temperature control means comprises a spring lever held at one end on said supporting means, and engaging said disc at its other end.

11. A switch as set forth in claim 7, in which the temperature control means comprises a spring lever held at one end on said supporting means, and engaging said disc at its other end, and an adjustable screw mounted in said supporting means and bearing upon said spring lever intermediate its ends.

12. A switch as set forth in claim 7, in which the temperature control means comprises a spring lever struck from, and attached at one end to, said supporting means, and bearing at its other end upon said thermostatic disc.

13. A switch as set forth in claim 7, in which the temperature control means comprises a rigid lever, fulcrumed on said supporting means, and engaging said thermostatic disc at one end, a compression spring engaging the other end of said lever, and means varying the compression of said compression spring.

14. A switch as set forth in claim 7, in which the temperature control means comprises a resilient spider touching said thermostatic disc at a plurality of points located between the central and peripheral portions thereof, and adjustable means securing the central portion of said spider to said supporting means.

15. A switch as set forth in claim 7, in which both movable and stationary contacts are plural in number, whereby a series break arrangement is provided.

16. A control comprising a radially corrugated, snap-acting thermostatic disc, means supporting said disc, and means controlling the operating temperature of said disc comprising a spring lever held at one end in said supporting means, and bearing, at its other end, upon said disc at at least one point between the central portion and the periphery thereof.

17. An electric switch comprising a radially corrugated, snap-acting thermostatic disc, means supporting said disc, movable contact means, means mounting said contact means for movement with a movable region of said disc, stationary contact means positioned to be engaged by said movable contact means, and means controlling the operating temperature of said disc comprising resilient means bearing upon said disc at at least one point between the central portion and the periphery thereof.

18. A control comprising a radially corrugated, snap-acting thermostatic disc, means controlling the operating differential of said disc, and separate means controlling the operating temperature of said disc, said differential control means comprising means limiting the amplitude of motion of said disc and said temperature control means comprising means exerting a force upon the surface of said disc.

19. A control comprising a radially corrugated, snap-acting disc, means controlling the operating differential of said disc, and separate means controlling the temperature at which said disc snaps in response to external variations.

20. A control comprising a radially corrugated, snap-acting disc, means controlling the operating differential of said disc, and separate means controlling the temperature at which said disc snaps in response to external variations, said differential control means comprising means limiting the amplitude of motion of said disc.

21. A control comprising a radially corrugated, snap-acting disc, means controlling the operating differential of said disc, and separate means controlling the temperature at which said disc snaps in response to external variations, said last-named means comprising means exerting a force upon the surface of said disc.

22. A thermostatic electric switch comprising a snap-acting thermostatic disc, means mounting said disc at its periphery, at least one movable contact, means mounting said contact for movement with said disc, at least one stationary contact positioned to cooperate with said movable contact, means controlling the operating differential of said thermostatic disc comprising means limiting the thermostatic movement of the central portion of said disc, and means controlling the operating temperature of said thermostatic disc comprising a resilient element bearing upon at least one point on the surface of said disc, said point being located between the central portion and the periphery of said disc.

23. Control means comprising a snap-acting thermostatic disc, means mounting said disc at its periphery, and means controlling the operating differential of said thermostatic disc comprising means limiting the thermostatic movement of the central portion of said disc, and means controlling the operating temperature of said thermostatic disc comprising a resilient element bearing upon at least one point of the surface of said disc, said point being located between the central portion and the periphery of said disc.

24. A thermostatic electric switch comprising a snap-acting thermostatic disc, means mounting said disc but leaving a portion thereof free for thermostatic movement, at least one movable contact, means mounting said contact for movement with the movable portion of said disc, at least one stationary contact positioned to cooperate with said movable contact, means controlling the operating differential of said thermostatic disc comprising means limiting the thermostatic movement of the movable portion of said disc, and means controlling the operating temperature of said thermostatic disc comprising a resilient element bearing upon at least one point on the surface of said disc, said point being located between the central portion and the periphery of said disc.

25. Control means comprising a snap-acting thermostatic disc, means mounting said disc but leaving a portion thereof free for thermostatic movement, means controlling the operating differential of said thermostatic disc comprising means limiting the thermostatic movement of the movable portion of said disc, and means controlling the operating temperature of said thermostatic disc comprising a resilient element bearing upon at least one point on the surface of said disc, said point being located between the central portion and the periphery of said disc.

JOHN A. SPENCER.